Patented May 3, 1938

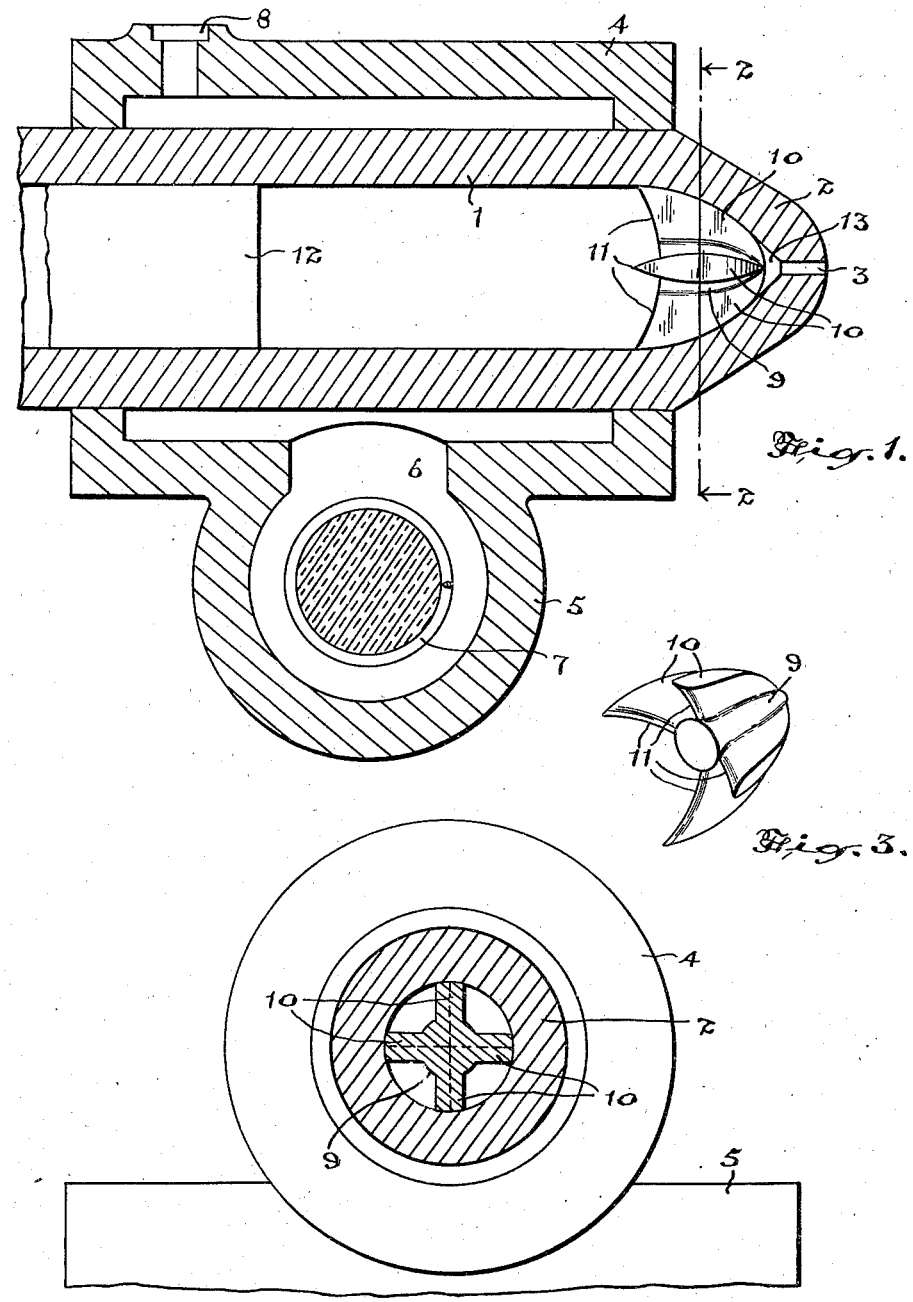

2,115,940

UNITED STATES PATENT OFFICE 2,115,940

MACHINE FOR INJECTION OF PLASTICS

Arthur A. Burry, Toronto, Ontario, Canada

Application October 19, 1936, Serial No. 106,271
In Canada September 5, 1935

2 Claims. (Cl. 18—30)

The principal objects of this invention are to overcome the difficulties met with in the moulding of plastic materials, such for instance as cellulose compounds and phenol condensation compounds, whereby a uniform flow of material from the injection nozzle may be obtained, and whereby the heat applied to plasticize the material may be effectively controlled.

The principal features of the invention consist in the novel arrangement of a heating jacket surrounding the injection cylinder with means for maintaining a constant temperature in such jacket, and means for directing the plastic material at the discharge end of the cylinder to effectively maintain a uniform plasticity of the material being extruded from the cylinder.

In the accompanying drawing, Figure 1 is a longitudinal sectional elevation of the heated portion and discharge end of a plastic moulding cylinder.

Figure 2 is a cross section and elevation through the line 2—2 of Figure 1.

Figure 3 is a perspective detail of the flow directing means arranged within the cylinder head.

In the manufacture of articles moulded under pressure from heated plastics, it has been found difficult to maintain a uniform temperature throughout the body of material contained in the pressure cylinder, principally owing to the fact that it requires from 200 to 300 pounds per square inch of steam pressure to obtain a temperature sufficient to plasticize the moulding compound and the known forms of heat application create too much fluctuation.

These difficulties have been overcome in a very simple manner in the device herein shown, in which the cylinder 1, in which the plastic material is confined, is formed with a tapering discharge end 2, which leads to the discharge orifice 3. Surrounding the cylinder 1 is a cylindrical jacket 4, which may form a part of or be secured to the cylinder, and forming a part with or secured to this jacket is a transversely arranged cylinder 5, the interior of which communicates with the interior of the jacket 4 through the opening 6.

Arranged within the cylinder 5 and extending longitudinally thereof is a suitable form of electric heater element 7, which supplies heat to a body of water surrounding said element within the cylinder 5. The jacket 4 is provided with a supply orifice 8, which may be provided with a suitable form of relief valve if desired. It is preferred, however, to arrange within the cylinder 5 a suitable form of thermostat to control the supply of electric current to the heating element 7.

There are many standard forms of thermostatic control, which may be utilized for this purpose and it is not deemed necessary to either show or describe any particular form, but it is readily understood that the electric heater may heat the water surrounding the same to create steam of a desired pressure and temperature, and the steam and the surrounding body of metal will maintain its temperature uniformly, even though the current supply to the heater may fluctuate due to being cut on and off.

The uniformity of heat applied will maintain the plastic material contained in the cylinder at a uniform state of plasticity for a substantially uniform depth, but as the material varies in its characteristics, it is found that the central part of the material in the cylinder may be less plastic than that closer to the cylinder, and in order to ensure uniformity of plasticity of the material being forced through the discharge orifice 3, I provide a means for diverting the plastic material from the centre outwardly to mix in intimate contact with the more plastic outer material and to be forced into closer association with the heated cylinder wall.

This device is in the form of a steel or other metal member comprising a central boss 9 formed with a plurality of vanes 10, which are of a lance-shaped form in longitudinal section presenting sharp edges 11 extending from the centre boss to the inner wall of the cylinder. Any desired number of these dividing vanes may be used. As the plastic material is forced endwise by the plunger 12, the harder core in the center is held by engagement with the boss 9 and, as it softens and spreads, it is split by the edges 11 of the vanes 10 and directed outwardly to mix with the more plastic material at the outward part of the cylinder, and the uniformly plasticized material is directed into contact with the cylinder wall at its tapering end 2.

The outward edges of the vanes 10 are formed in a shorter curve than the taper of the walls 2 on the inner side, so that there is a cavity or space 13 between the outward end of the vanes and the inner wall 2 surrounding the discharge orifice 3, and the material divided by the vanes 10 is permitted to flow inwardly in a homogeneous plastic mass as it enters the discharge orifice.

The result of the directly applied heat and the obstruction of the less plastic material from choking the discharge nozzle produces a very desirable and uniform resultant material to be directed into the moulds, in which the articles to be moulded are formed.

What I claim as my invention is:—

1. A plastic injection device comprising a cylinder having a discharge orifice, pressure means for ejecting the cylinder contents, a sealed jacket spaced from and surrounding a portion of said cylinder, and an immersion electric heating unit arranged at the bottom of said jacket below the bottom of said cylinder, said jacket containing a body of water surrounding said heater and spaced from said cylinder whereby the heating unit generates steam and effects the continuous flow around said portion of the cylinder to create and maintain a substantially uniform temperature surrounding the cylinder to plasticize the contents thereof.

2. A plastic injection device comprising a cylinder having a discharge orifice, pressure means for ejecting the cylinder contents, a sealed jacket spaced from and surrounding said cylinder, a chamber depending from said jacket adapted to contain a body of water and communicating with the space in said jacket through a restricted opening, and an immersion electric heater arranged in said chamber and adapted to be surrounded by said body of water and to generate steam.

ARTHUR A. BURRY.